United States Patent
Rupley et al.

(10) Patent No.: US 9,244,841 B2
(45) Date of Patent: Jan. 26, 2016

(54) MERGING EVICTION AND FILL BUFFERS FOR CACHE LINE TRANSACTIONS

(71) Applicants: Jeff Rupley, Round Rock, TX (US); Tarun Nakra, Austin, TX (US)

(72) Inventors: Jeff Rupley, Round Rock, TX (US); Tarun Nakra, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 230 days.

(21) Appl. No.: 13/731,292

(22) Filed: Dec. 31, 2012

(65) Prior Publication Data
US 2014/0189245 A1 Jul. 3, 2014

(51) Int. Cl.
 *G06F 12/00* (2006.01)
 *G06F 13/00* (2006.01)
 *G06F 13/28* (2006.01)
 *G06F 12/08* (2006.01)
 *G06F 5/06* (2006.01)
 *G06F 13/16* (2006.01)

(52) U.S. Cl.
 CPC ........ *G06F 12/0811* (2013.01); *G06F 12/0808* (2013.01); *G06F 5/065* (2013.01); *G06F 13/1673* (2013.01)

(58) Field of Classification Search
 CPC .......................... G06F 12/0808; G06F 12/0811
 See application file for complete search history.

(56) References Cited

U.S. PATENT DOCUMENTS

| | | | | |
|---|---|---|---|---|
| 3,735,360 A * | 5/1973 | Anderson et al. | ............. | 711/149 |
| 5,355,467 A * | 10/1994 | MacWilliams | ..... | G06F 12/0811 711/146 |
| 5,404,483 A * | 4/1995 | Stamm | .................. | G06F 9/3836 711/108 |
| 5,524,234 A * | 6/1996 | Martinez, Jr. | ....... | G06F 12/0804 711/141 |
| 5,526,510 A * | 6/1996 | Akkary et al. | ................. | 711/133 |
| 5,577,227 A * | 11/1996 | Finnell et al. | .................. | 711/122 |
| 5,903,910 A * | 5/1999 | Tran et al. | ...................... | 711/132 |
| 6,101,581 A * | 8/2000 | Doren et al. | ................... | 711/141 |
| 6,347,363 B1 * | 2/2002 | Arimilli | .............. | G06F 12/0811 711/122 |
| 6,415,362 B1 * | 7/2002 | Hardage | ............ | G06F 12/0811 711/109 |
| 6,782,452 B2 * | 8/2004 | Williams, III | ................ | 711/133 |
| 7,290,116 B1 * | 10/2007 | Grohoski | ............ | G06F 12/0864 711/130 |
| 7,412,567 B2 * | 8/2008 | Zeffer | ................. | G06F 12/0808 711/141 |
| 7,490,200 B2 * | 2/2009 | Clark | .................. | G06F 12/0811 711/120 |
| 7,594,080 B2 * | 9/2009 | Lovett et al. | ................... | 711/133 |
| 7,596,662 B2 * | 9/2009 | Makineni et al. | ............. | 711/122 |
| 7,624,236 B2 * | 11/2009 | Chrysos | .............. | G06F 12/0804 711/141 |
| 7,669,009 B2 * | 2/2010 | Kottapalli | ............. | G06F 12/123 711/122 |
| 7,676,633 B1 * | 3/2010 | Fair et al. | ....................... | 711/133 |
| 7,685,372 B1 * | 3/2010 | Chen | .................. | G06F 12/0811 711/122 |
| 7,809,889 B2 * | 10/2010 | Nychka | ............... | G06F 12/0811 711/119 |
| 7,836,262 B2 * | 11/2010 | Gunna et al. | ................... | 711/143 |

(Continued)

OTHER PUBLICATIONS

Definition of "swap", Merriam-Webster Online Dictionary, retrieved from http://www.merriam-webster.com/dictionary/swap on Oct. 9, 2014 (1 page).*

(Continued)

*Primary Examiner* — Tuan Thai
*Assistant Examiner* — Daniel C Chappell

(57) ABSTRACT

A processor includes a first cache memory and a bus unit in some embodiments. The bus unit includes a plurality of buffers and is operable to allocate a selected buffer of a plurality of buffers for a fill request associated with a first cache line to be stored in a first cache memory, load fill data from the first cache line into the selected buffer, and transfer the fill data to the first cache memory in parallel with storing eviction data for an evicted cache line from the first cache memory in the selected buffer.

15 Claims, 6 Drawing Sheets

(56) References Cited

U.S. PATENT DOCUMENTS

| | | | | |
|---|---|---|---|---|
| 7,877,559 B2* | 1/2011 | Lauterbach | ......... | G06F 12/0804 710/56 |
| 8,145,848 B2* | 3/2012 | Jain | ..................... | G06F 12/0804 711/118 |
| 8,180,981 B2* | 5/2012 | Kapil | ..................... | G06F 12/08 365/185.08 |
| 8,195,883 B2* | 6/2012 | Jain | ..................... | G06F 12/0811 710/100 |
| 8,209,490 B2* | 6/2012 | Mattina | ................. | G06F 12/084 711/121 |
| 8,347,035 B2* | 1/2013 | Santhanakrishnan | | G06F 12/0808 711/118 |
| 8,516,196 B2* | 8/2013 | Jain | ..................... | G06F 12/0811 711/118 |
| 8,621,145 B1* | 12/2013 | Kimmel et al. | ............... | 711/113 |
| 8,751,746 B2* | 6/2014 | Lilly | ..................... | G06F 12/084 711/118 |
| 8,959,290 B2* | 2/2015 | Rajagopalan | ....... | G06F 12/0808 711/141 |
| 8,966,232 B2* | 2/2015 | Tran | .................... | G06F 9/30189 712/229 |
| 9,043,554 B2* | 5/2015 | Lilly | .................. | G06F 12/0811 711/122 |
| 9,047,198 B2* | 6/2015 | Kannan | ............... | G06F 12/0862 |
| 2003/0110356 A1* | 6/2003 | Williams, III | ................ | 711/133 |
| 2003/0217230 A1* | 11/2003 | Rodriguez et al. | ............ | 711/136 |
| 2004/0103251 A1* | 5/2004 | Alsup | ........................... | 711/122 |
| 2005/0060383 A1* | 3/2005 | Lovett et al. | ................... | 709/213 |
| 2007/0091679 A1* | 4/2007 | Nishihara et al. | ........ | 365/185.11 |
| 2008/0059707 A1* | 3/2008 | Makineni et al. | ............. | 711/122 |
| 2010/0011166 A1* | 1/2010 | Yu et al. | ........................ | 711/128 |
| 2010/0332754 A1* | 12/2010 | Lai et al. | ....................... | 711/118 |
| 2011/0131379 A1* | 6/2011 | Jain et al. | ...................... | 711/133 |

OTHER PUBLICATIONS

Reducing conflicts in direct-mapped caches with a temporality-based design, Rivers et al, Proceedings of the 1996 International Conference on Parallel Processing, Aug. 12-16, 1996, pp. 154-163 (10 pages).*

Improving data cache performance with integrated use of split caches, victim cache and stream buffers, Naz et al, ACM SIGARCH Computer Architecture News—Special issue: MEDEA 2004 workshop, Jun. 2005, vol. 33 iss. 3, pp. 41-48 (8 pages).*

Definition of memory, Webopedia, Feb. 22, 2008, retrieved from https://web.archive.org/web/20080222011719/http://www.webopedia.com/TERM/M/memory.html on Oct. 8, 2014 (1 page).*

Definition of buffer, Webopedia, Jul. 9, 2008, retrieved from https://web.archive.org/web/20080709181317/http://www.webopedia.com/TERM/b/buffer.html on Jan. 23, 2015 (2 pages).*

* cited by examiner

MERGING EVICTION AND FILL BUFFERS FOR CACHE LINE TRANSACTIONS

BACKGROUND

The disclosed subject matter relates generally to computing devices having cache memories and, more particularly, to a merging eviction and fill buffers for cache line transactions.

A typical computer system includes a memory hierarchy to obtain a relatively high level of performance at a relatively low cost. Instructions of different software programs are typically stored on a relatively large but slow non-volatile storage unit (e.g., a disk drive unit). When a user selects one of the programs for execution, the instructions of the selected program are copied into a main memory, and a processor (e.g., a central processing unit or CPU) obtains the instructions of the selected program from the main memory. Some portions of the data are also loaded into cache memories of the processor or processors in the system. A cache memory is a smaller and faster memory that stores copies of instructions and/or data that are expected to be used relatively frequently. For example, central processing units (CPUs) are generally associated with a cache or a hierarchy of cache memory elements. Processors other than CPUs, such as, for example, graphics processing units (GPUs) and others, are also known to use caches.

The cache memory closest to the processor core is typically referred to as the L1 cache. A L2 cache may be located on a different die than the processor and L1 cache, and it may be shared across multiple processor cores. Due to the limited size of the L1 cache it is sometimes necessary to evict a cache line residing in the L1 cache to make room for a cache line being added. Evicted cache lines are sent to the L2 cache, which is typically larger than the L1 cache.

To handle cache fills and evictions are plurality of data fill buffers and data eviction buffers are typically employed. Data fill buffers hold the data fills before they can be sent to the cache. The cache fill port may not always be available. For example, the fill port may be servicing an older fill transaction. Hence, the data fill buffers allow data to be temporarily buffered prior to scheduling the line fill into the cache. A fill request can only be sent to the L2 cache if a free data fill buffer is present. A miss in the L1 cache and subsequent fill may also require a different line to be evicted out of the L1 cache. The data eviction buffers hold the evictions before the evicted data can be sent out to the L2 cache. These cache evictions are triggered by the fills or external probes from other cores.

For a 64 byte cache line, each fill transaction puts 64 bytes worth of line data into the cache in a sequence of four consecutive (16 byte) beats. Since a cache fill can cause another line to be evicted out of the cache, the fill is sent only when a free eviction buffer is present to hold the evicted data, if necessary. The victim data is written out from the cache concurrent to the incoming fill, i.e., each incoming 16 byte fill beat on the fill port causes the victim line's corresponding 16 byte chunk to be evicted out on the read port.

The performance of the cache is directly related to having a sufficient number of fill and eviction buffers to handle the cache traffic. If not enough buffers are present, bottlenecks can occur. However, the buffers consume an appreciable amount of real estate on the die and also consume power. Thus, there is direct tradeoff between performance and real estate and power consumption.

This section of this document is intended to introduce various aspects of art that may be related to various aspects of the disclosed subject matter described and/or claimed below. This section provides background information to facilitate a better understanding of the various aspects of the disclosed subject matter. It should be understood that the statements in this section of this document are to be read in this light, and not as admissions of prior art. The disclosed subject matter is directed to overcoming, or at least reducing the effects of, one or more of the problems set forth above.

BRIEF SUMMARY OF EMBODIMENTS

The following presents a simplified summary of only some aspects of embodiments of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

Some embodiments include a processor having a first cache memory and a bus unit. The bus unit includes a plurality of buffers and is operable to allocate a selected buffer of a plurality of buffers for a fill request associated with a first cache line to be stored in a first cache memory, load fill data from the first cache line into the selected buffer, and transfer the fill data to the first cache memory in parallel with storing eviction data for an evicted cache line from the first cache memory in the selected buffer.

Some embodiments include a method including allocating a selected buffer of a plurality of buffers for a fill request associated with a first cache line to be stored in a first cache memory, loading fill data from the first cache line into the selected buffer, and transferring the fill data to the first cache memory in parallel with storing eviction data for an evicted cache line from the first cache memory in the selected buffer.

BRIEF DESCRIPTION OF THE DRAWINGS

The disclosed subject matter will hereafter be described with reference to the accompanying drawings, wherein like reference numerals denote like elements, and.

Figure 1:
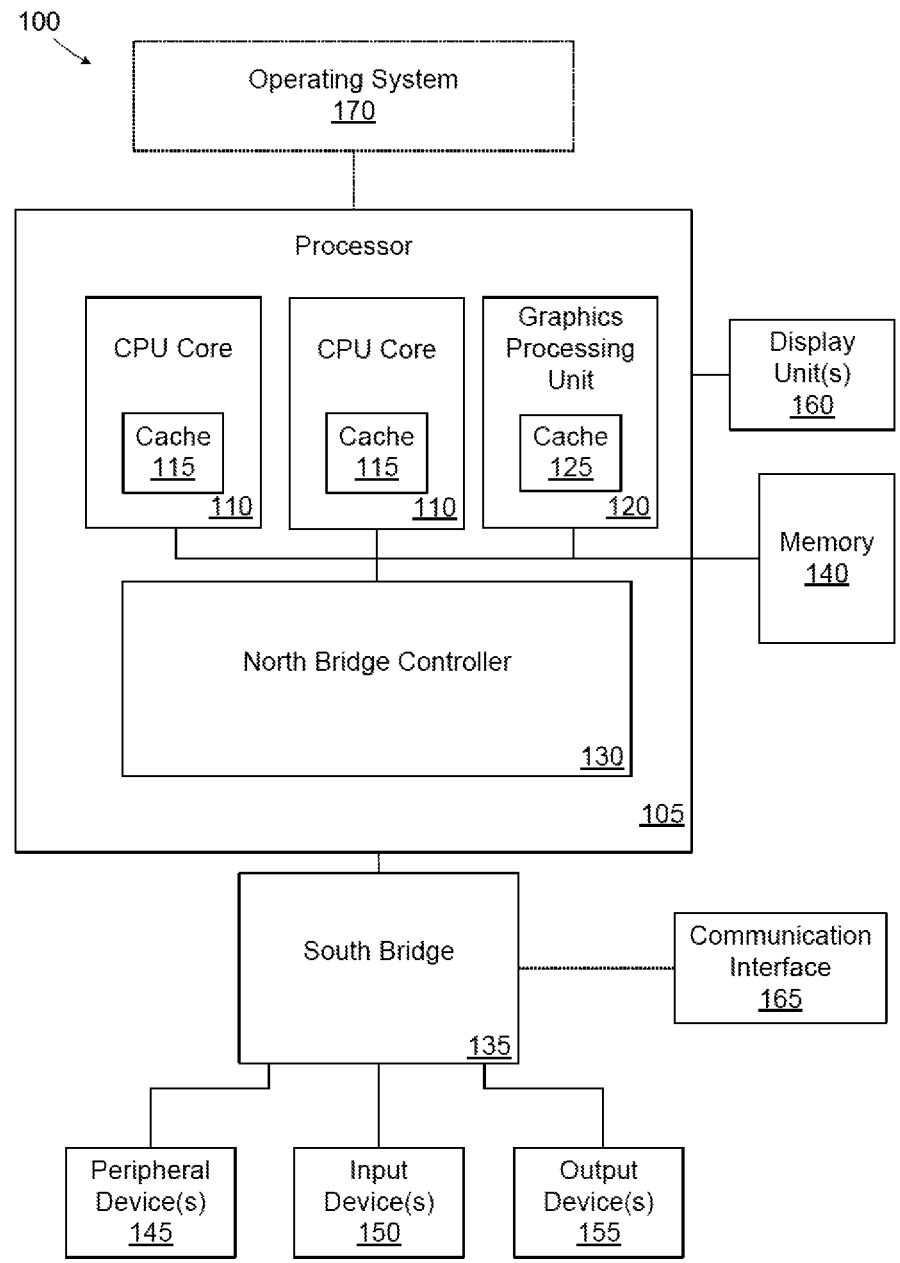
FIG. 1 is a simplified block diagram of a computer system operable to manage cache memories using shared fill and eviction buffers, in accordance with some embodiments.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

DETAILED DESCRIPTION

One or more specific embodiments of the disclosed subject matter will be described below. It is specifically intended that the disclosed subject matter not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the disclosed subject matter unless explicitly indicated as being "critical" or "essential."

The disclosed subject matter will now be described with reference to the attached figures. Various structures, systems and devices are schematically depicted in the drawings for purposes of explanation only and so as to not obscure the disclosed subject matter with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Referring now to the drawings wherein like reference numbers correspond to similar components throughout the several views and, specifically, referring to FIG. 1, the disclosed subject matter shall be described in the context of a computer system 100 including an accelerated processing unit (APU) 105. The APU 105 includes one or more central processing unit (CPU) cores 110 and their associated caches 115 (e.g., L1, L2, or other level cache memories), a graphics processing unit (GPU) 120 and its associated caches 125 (e.g., L1, L2, L3, or other level cache memories), a north bridge (NB) controller 130. Caches 115 and 125 may be shared by processing units and be located outside a processing unit at the processor 105 level in some embodiments. For example, processing units 110 and 120 may include an L1 cache, while processor 105 may include L2 and L3 caches. The system 100 also includes a south bridge (SB) 135, and system memory 140 (e.g., DRAM). The NB controller 130 provides an interface to the south bridge 135 and to the system memory 140. To the extent certain exemplary aspects of the cores 110 and/or one or more cache memories 115 and 120 are not described herein, such exemplary aspects may or may not be included in various embodiments without limiting the spirit and scope of the embodiments of the present subject matter as would be understood by one of skill in the art.

In some embodiments, the computer system 100 may interface with one or more peripheral devices 145, input devices 150, output devices 155, and/or display units 160. A communication interface 165, such as a network interface circuit (NIC), may be connected to the south bridge 135 for facilitating network connections using one or more communication topologies (wired, wireless, wideband, etc.). It is contemplated that in various embodiments, the elements coupled to the south bridge 135 may be internal or external to the computer system 100, and may be wired, such as illustrated as being interfaces with the south bridge 135, or wirelessly connected, without affecting the scope of the embodiments of the present subject matter. The display units 160 may be internal or external monitors, television screens, handheld device displays, and the like. The input devices 150 may be any one of a keyboard, mouse, track-ball, stylus, mouse pad, mouse button, joystick, scanner or the like. The output devices 155 may be any one of a monitor, printer, plotter, copier or other output device. The peripheral devices 145 may be any other device which can be coupled to a computer: a CD/DVD drive capable of reading and/or writing to corresponding physical digital media, a universal serial bus ("USB") device, Zip Drive, external floppy drive, external hard drive, phone, and/or broadband modem, router, gateway, access point, and/or the like. To the extent certain example aspects of the computer system 100 are not described herein, such example aspects may or may not be included in various embodiments without limiting the spirit and scope of the embodiments of the present application as would be understood by one of skill in the art. The operation of the system 100 is generally controlled by an operating system 170 including software that interfaces with the various elements of the system 100. In various embodiments the computer system 100 may be a personal computer, a laptop computer, a handheld computer, a tablet computer, a mobile device, a telephone, a personal data assistant ("PDA"), a server, a mainframe, a work terminal, a music player, smart television, and/or the like.

Instructions of different software programs are typically stored on a relatively large but slow non-volatile storage unit (e.g., internal or external disk drive unit). When a user selects one of the programs for execution, the instructions and data associated with the selected program are copied into the system memory 140, and the processor 105 obtains the instructions and data for the selected program from the system memory 140. Some portions of the data are also loaded into cache memories 115 of one or more of the cores 110 to facilitate faster retrieval and processing.

The caches 115, 125 are smaller and faster memories (i.e., as compared to the system memory 140) that store copies of instructions and/or data that are expected to be used relatively frequently during normal operation. The cores 110 and/or the GPU 120 may employ a hierarchy of cache memory elements.

Instructions or data that are expected to be used by a processing unit 110, 120 during normal operation are moved from the relatively large and slow system memory 140 into the cache 115, 120. When the processing unit 110, 120 needs to read or write a location in the system memory 140, control logic for the cache 115, 125 first checks to see whether the desired memory location is included in the cache 115, 125. If this location is included in the cache 115, 125 (i.e., a cache hit), then the processing unit 110, 120 can perform the read or write operation on the copy in the cache 115, 125. If this location is not included in the cache 115, 125 (i.e., a cache miss), then the processing unit 110, 120 needs to access the information stored in the system memory 140 and, in some cases, the information may be copied from the system memory 140 and added to the cache 115, 125. Proper configuration and operation of the cache 115, 125 can reduce the latency of memory accesses below the latency of the system memory 135 to a value close to the value of the cache memory 115, 125.

Figure 2:
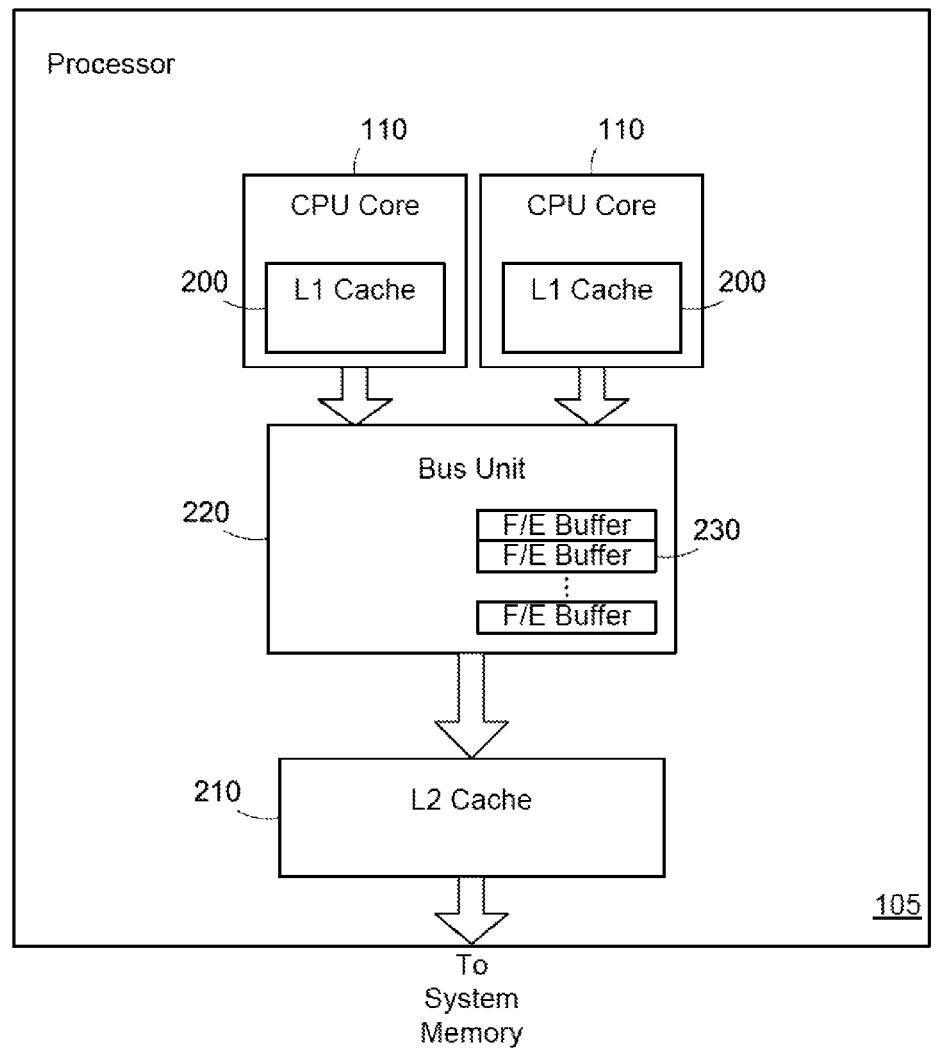
FIG. 2 is a simplified diagram of a cache hierarchy implemented by the system of FIG. 1, in accordance with some embodiments.

FIG. 2 is a block diagram illustrating the cache hierarchy employed by the processor 105, according to some embodiments. The processor 105 employs a hierarchical cache that divides the cache into two levels known as the L1 cache and the L2 cache. Each core 110 has its own L1 cache 200 and the cores 110 share an associated L2 cache 210. A bus unit 220 is disposed between the L1 and L2 caches 200, 210 to facilitate fills and evictions. The system memory 140 is downstream of the L2 cache 210. A particular core 110 first attempts to locate needed memory locations in the L1 cache 200. The illustrated L1 cache 200 and L2 cache 210 blocks are intended to represent the cache memory array and any associated control logic. Hence, if it stated that the L1 cache 200 reports a cache miss, it intended to represent that the L1 cache control logic had determined that the requested data is not present in the cache memory array. The cache logic may maintain an index for recording what data is stored in the array.

If a L1 cache miss is received, the memory request passes down to the L2 cache 210. If a L2 cache miss is received, the memory request passes down to the system memory 140. Although the hierarchy is illustrated as having a two level cache, in some embodiments, additional levels may be provided. For example, multiple CPU clusters may be provided, where each core in a cluster has its own L1 cache, and each cluster shares a L2 cache. A L3 cache may be provided for sharing by the multiple clusters. In some embodiments, the L1 cache can be further subdivided into separate L1 caches for storing instructions, L1-I, and data, L1-D. Frequently used instructions are copied from the L2 cache into the L1-I cache and frequently used data can be copied from the L2 cache into the L1-D cache. The L1-I cache can be placed near entities that require more frequent access to instructions than data, whereas the L1-D cache can be placed closer to entities that require more frequent access to data than instructions. The L2 cache 220 is typically associated with both the L1-I and L1-D caches. The functions of the bus unit 220 described herein can be applied to the L1-I cache, the L1-D cache, or both.

The bus unit 220 coordinates fills for the L1 cache 200 and evictions therefrom. Fill data may come from the L2 cache 210, from the system memory 140. If fill data is received from the system memory 140, it may be provided to the L2 cache 210 and the bus unit 220 for inclusion in the L1 cache 200 in parallel, in some embodiments. The bus unit 200 maintains a plurality of shared fill/eviction buffers 230. A fill/eviction buffer 230 is allocated for a cache fill event. If a cache eviction results from the cache fill, the eviction data is stored in the fill/eviction buffer 230 as the fill data exits.

Figure 3A:
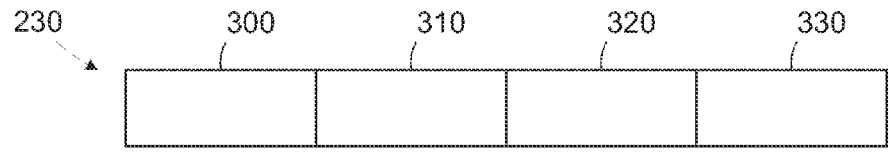
FIGS. 3A-3D illustrate the use of a fill/eviction buffer for implementing a cache line fill, according to some embodiments.
Figure 3B:
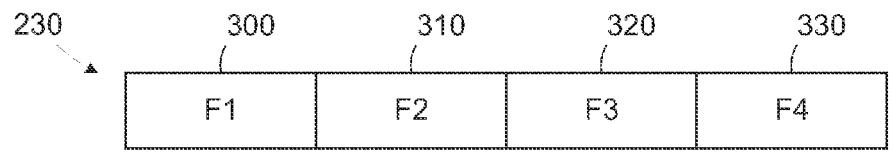
Figure 3C:
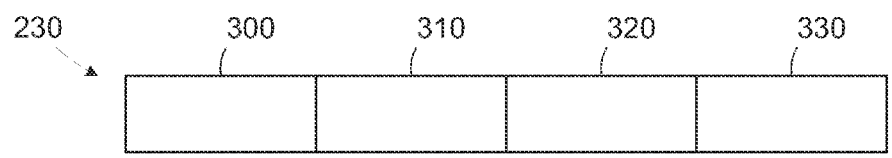
Figure 3D:
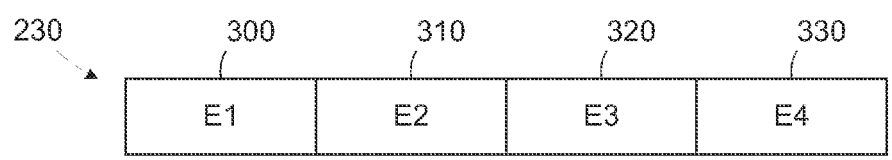

FIGS. 3A-3D illustrate the use of a fill/eviction buffer 230 for implementing a cache line fill, according to some embodiments. Cache fills are handled using a plurality of beats. For example, for a 64 byte cache line, four 16 byte beats may be employed. Accordingly, the fill/eviction buffer 230 is divided into beat segments 300, 310, 320, 330. The bus unit 220 allocates an empty fill/eviction buffer 230 when an L2 cache fill is requested, as illustrated in FIG. 3A. The fill data, F1-F4, is loaded into the fill/eviction buffer 230 from the L2 cache 210 or from the system memory 140 if the request misses the L2 cache 210, as illustrated in FIG. 3B. When the load port of the L1 cache 200 is available, the bus unit 220 begins the fill and the fill/eviction buffer 230 is emptied, as illustrated in FIG. 3C. If no eviction is necessitated by the fill, the empty fill/eviction buffer 230 may be reallocated to a new fill event. If an eviction is associated with the fill, the bus unit 220 receives the eviction data from the L1 cache 200 and stores the eviction data, E1-E4 into the fill/eviction buffer 230, as illustrated in FIG. 3D. The eviction data illustrated in FIG. 3D can be written to the L2 cache 220 when its load port is available, and the empty fill/eviction buffer 230 may be reallocated to a new fill event.

Figure 4A:
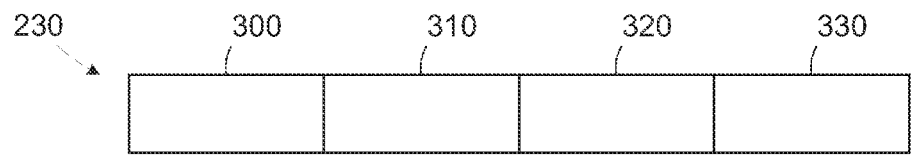
FIGS. 4A-4F illustrate the use of a fill/eviction buffer for implementing a cache line fill in parallel with the cache line eviction, according to some embodiments.
Figure 4B:
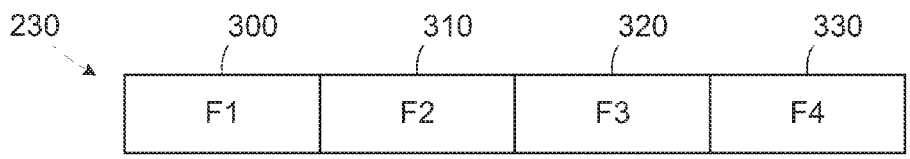
Figure 4C:
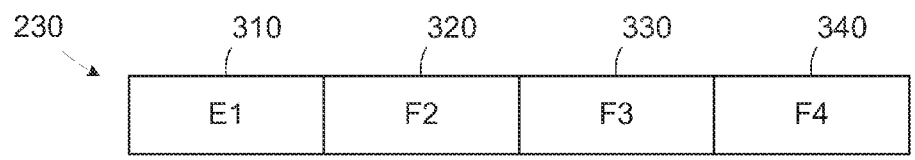
Figure 4D:
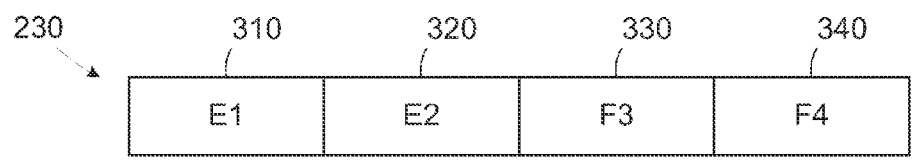
Figure 4E:
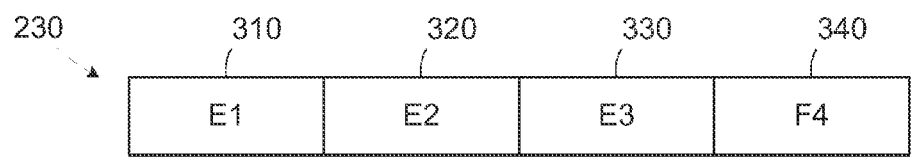
Figure 4F:
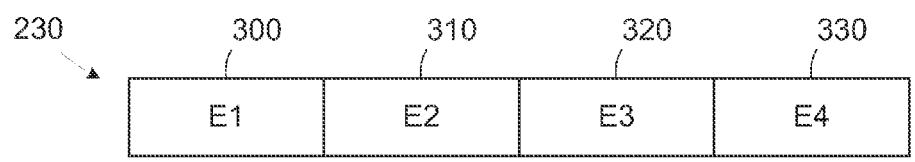

FIGS. 4A-4F illustrate the use of a fill/eviction buffer 230 for implementing a cache line fill in parallel with the cache line eviction, according to some embodiments. The bus unit 220 allocates an empty fill/eviction buffer 230 when an L2 cache fill is requested, as illustrated in FIG. 4A. The fill data, F1-F4, is loaded into the fill/eviction buffer 230 from the L2 cache 210 or from the system memory 140 if the request misses the L2 cache 210, as illustrated in FIG. 4B. When the load port of the L1 cache 200 is available, the bus unit 220 begins the fill and the fill/eviction buffer 230 is emptied one beat at a time. As illustrated in FIG. 4C, the first beat in beat segment 300 is written to the load port of the L1 cache 200, and the first beat of the evicted cache line is read from the read port of the L1 cache 200 and written to the beat segment 300. The beats in the beat segments 310, 320, 330 are transferred and overwritten by the evicted beats, as illustrated in FIGS. 4D-4F. The eviction data illustrated in FIG. 4F can be written to the L2 cache 220 when its load port is available, and the empty fill/eviction buffer 230 may be reallocated to a new fill event. Shifting the fill data and evicted data in parallel reduces the number of cycles required to implement the fill and its associated eviction.

Figure 5:
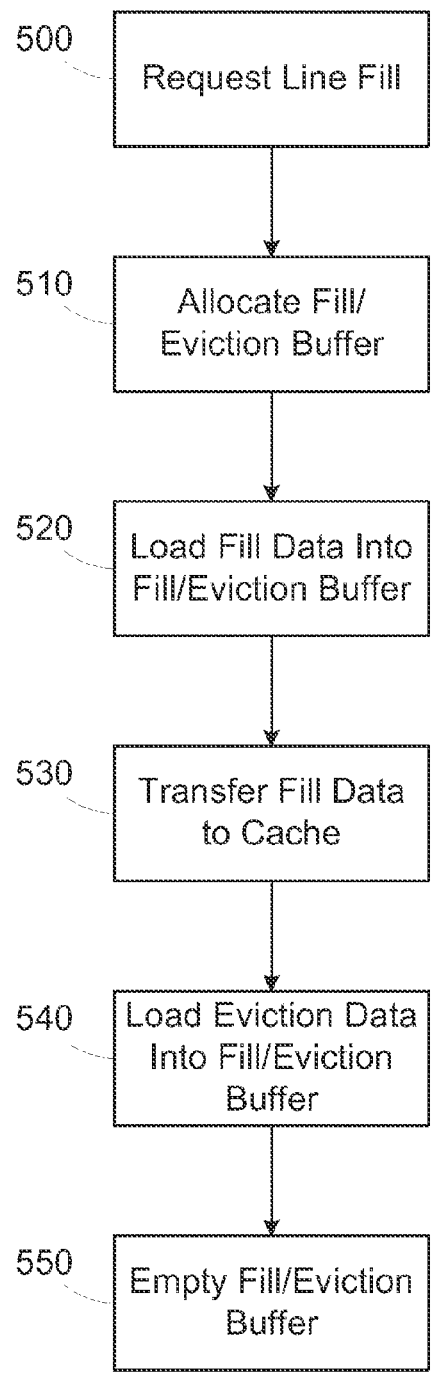
FIG. 5 is a simplified flow diagram of a method for performing parallel cache line fills and evictions, according to some embodiments.

FIG. 5 is a simplified flow diagram of a method for performing parallel cache line fills and evictions, according to some embodiments. In block 500, a cache line fill is requested. The cache line request may be to fill a line in the L1 cache 200. In block 510, a fill/eviction buffer 230 is allocated for the fill. In block 520, the fill data is loaded into the fill/eviction buffer 230. In block 530, the fill data is transferred to the L1 cache 200. In block 540, the eviction data is transferred into the fill/eviction buffer 230. The fill and eviction steps of blocks 530, 540 are performed in parallel with respect to the fill/eviction buffer 230. The parallel use of the fill/eviction buffer 230 may involve emptying the fill data and then loading the eviction data as illustrated in FIGS. 3A-3D or the beat-wise fill and eviction technique illustrated in FIGS. 4A-4F. In block 550, the fill/eviction buffer 230 is emptied by transferring the evicted cache line to the L2 cache 210.

Figure 6:
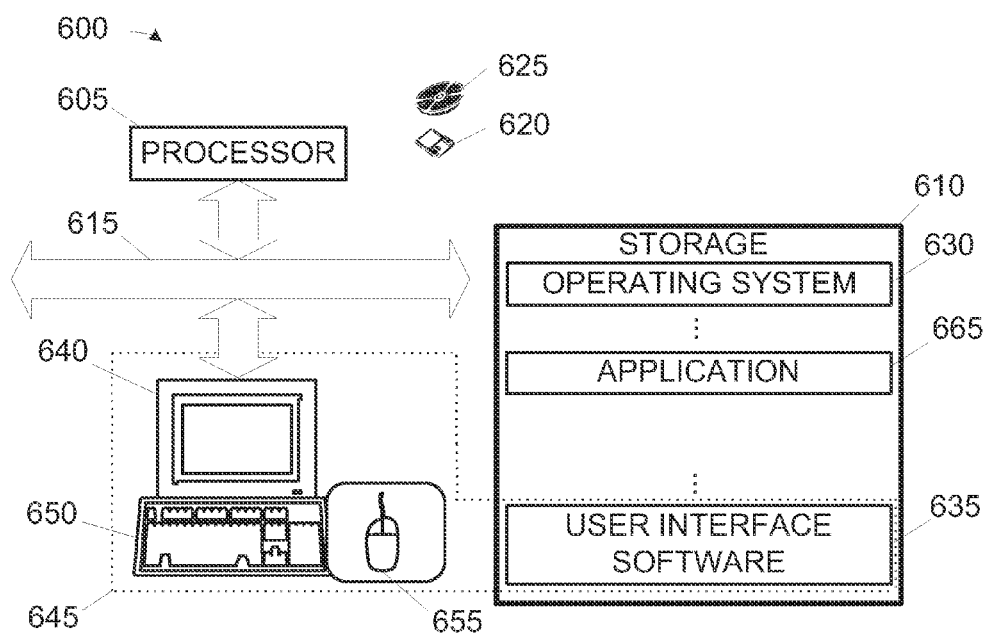
FIG. 6 is a simplified diagram of a computing apparatus that may be programmed to direct the fabrication of the integrated circuit device of FIGS. 1 and 2, in accordance with some embodiments.

FIG. 6 illustrates a simplified diagram of selected portions of the hardware and software architecture of a computing apparatus 600 such as may be employed in some aspects of the present subject matter. The computing apparatus 600 includes a processor 605 communicating with storage 610 over a bus system 615. The storage 610 may include a hard disk and/or random access memory (RAM) and/or removable storage, such as a magnetic disk 620 or an optical disk 625. The storage 610 is also encoded with an operating system 630, user interface software 635, and an application 640. The user interface software 635, in conjunction with a display 645, implements a user interface 650. The user interface 650 may include peripheral I/O devices such as a keypad or keyboard 655, mouse 660, etc. The processor 605 runs under the control of the operating system 630, which may be practically any operating system known in the art. The application 640 is invoked by the operating system 630 upon power up, reset, user interaction, etc., depending on the implementation of the operating system 630. The application 640, when invoked, performs a method of the present subject matter. The user may invoke the application 640 in conventional fashion through the user interface 650. Note that although a stand-alone system is illustrated, there is no need for the data to reside on the same computing apparatus 600 as the simulation application 640 by which it is processed. Some embodiments of the present subject matter may therefore be implemented on a distributed computing system with distributed storage and/or processing capabilities.

It is contemplated that, in some embodiments, different kinds of hardware descriptive languages (HDL) may be used in the process of designing and manufacturing very large scale integration circuits (VLSI circuits), such as semiconductor products and devices and/or other types semiconductor devices. Some examples of HDL are VHDL and Verilog/Verilog-XL, but other HDL formats not listed may be used. In one embodiment, the HDL code (e.g., register transfer level (RTL) code/data) may be used to generate GDS data, GDSII data and the like. GDSII data, for example, is a descriptive file format and may be used in different embodiments to represent a three-dimensional model of a semiconductor product or device. Such models may be used by semiconductor manufacturing facilities to create semiconductor products and/or devices. The GDSII data may be stored as a database or other program storage structure. This data may also be stored on a computer readable storage device (e.g., storage 610, disks 620, 625, solid state storage, and the like). In one embodiment, the GDSII data (or other similar data) may be adapted to configure a manufacturing facility (e.g., through the use of mask works) to create devices capable of embodying various aspects of the disclosed embodiments. In other words, in various embodiments, this GDSII data (or other similar data) may be programmed into the computing apparatus 600, and executed by the processor 605 using the application 665, which may then control, in whole or part, the operation of a semiconductor manufacturing facility (or fab) to create semiconductor products and devices. For example, in one embodiment, silicon wafers containing portions of the computer system 100 illustrated in FIGS. 1-2 may be created using the GDSII data (or other similar data).

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosed subject matter. Accordingly, the protection sought herein is as set forth in the claims below.

We claim:

1. A processor, comprising:
   a first cache memory; and
   a bus unit comprising a plurality of buffers, the bus unit to:
      allocate a selected buffer of the plurality of buffers for a fill request associated with a first cache line to be stored in the first cache memory;
      load fill data responsive to the fill request from the first cache line into the selected buffer; and
      transfer the fill data from the selected buffer to the first cache memory in parallel with storing eviction data for an evicted cache line from the first cache memory in the selected buffer by transferring the fill data from the selected buffer to the first cache memory to empty the selected buffer and transferring the eviction data into the emptied selected buffer after one or more portions of the selected buffer have been emptied.

2. The processor of claim 1, further comprising a second cache memory, wherein the bus unit is operable to receive the first cache line from the second cache memory.

3. The processor of claim 2, wherein the bus unit is operable to transfer the eviction data from the selected buffer to the second cache memory and de-allocate the selected buffer.

4. The processor of claim 1, wherein the selected buffer is divided into a plurality of segments, the fill data is divided into a plurality of portions, one of the portions of the fill data is stored in each of the segments, the eviction data is divided into a plurality of portions, and the bus unit is further operable to transfer a first portion of the fill data stored in a first segment to the first cache memory, then store a first portion of the eviction data in the first segment, and sequentially repeat the transferring of remaining portions of the fill data and the storing of portions of the eviction data for the remaining segments.

5. A system, comprising:
   a system memory; and
   a processor, the processor comprising:
      a first cache memory; and
      a bus unit comprising a plurality of buffers, the bus unit to:
         allocate a selected buffer of the plurality of buffers for a fill request associated with a first cache line to be stored in the first cache memory;
         receive the first cache line and load fill data responsive to the fill request from the first cache line into the selected buffer; and
         transfer the fill data from the selected buffer to the first cache memory in parallel with storing eviction data for an evicted cache line from the first cache memory in the selected buffer by transferring the fill data from the selected buffer to the first cache memory to empty the selected buffer and transferring the eviction data into the emptied selected buffer after one or more portions of the selected buffer have been emptied.

6. The system of claim 5, wherein the bus unit is operable to receive the first cache line from the system memory.

7. The system of claim 5, further comprising a second cache memory, wherein the bus unit is operable to receive the first cache line from the second cache memory.

8. The system of claim 7, wherein the bus unit is operable to transfer the eviction data from the selected buffer to the second cache memory and de-allocate the selected buffer.

9. The system of claim 5, wherein the selected buffer is divided into a plurality of segments, the fill data is divided into a plurality of portions, one of the portions of the fill data is stored in each of the segments, the eviction data is divided into a plurality of portions, and the bus unit is further operable to transfer a first portion of the fill data stored in a first segment to the first cache memory, then store a first portion of the eviction data in the first segment, and sequentially repeat the transferring of remaining portions of the fill data and the storing of portions of the eviction data for the remaining segments.

10. A method, comprising:
   allocating a selected buffer of a plurality of buffers for a fill request associated with a first cache line to be stored in a first cache memory;
   loading fill data responsive to the fill request from the first cache line into the selected buffer; and transferring the fill data from the selected buffer to the first cache memory in parallel with storing eviction data for an evicted cache line from the first cache memory in the selected buffer by transferring the fill data from the selected buffer to the first cache memory to empty the selected buffer and transferring the eviction data into the emptied selected buffer after one or more portions of the selected buffer have been emptied.

11. The method of claim 10, further comprising receiving the first cache line from a system memory.

12. The method of claim 10, further comprising receiving the first cache line from a second cache memory.

13. The method of claim 12, further comprising:
transferring the eviction data from the selected buffer to the second cache memory; and
de-allocating the selected buffer.

14. The method of claim 10, wherein the selected buffer is divided into a plurality of segments, the fill data is divided into a plurality of portions, one of the portions of the fill data is stored in each of the segments, the eviction data is divided into a plurality of portions, and the method further comprises:
transferring a first portion of the fill data stored in a first segment to the first cache memory;
then storing a first portion of the eviction data in the first segment; and
sequentially repeating the transferring of remaining portions of the fill data and the storing of portions of the eviction data for the remaining segments.

15. A non-transitory computer readable storage device encoded with data that, when implemented in a manufacturing facility, adapts the manufacturing facility to create a processor, comprising:
a first cache memory; and
a bus unit comprising a plurality of buffers, the bus unit to:
allocate a selected buffer of a plurality of buffers for a fill request associated with a first cache line to be stored in a first cache memory;
load fill data responsive to the fill request from the first cache line into the selected buffer; and
transfer the fill data from the selected buffer to the first cache memory in parallel with storing eviction data for an evicted cache line from the first cache memory in the selected buffer by transferring the fill data from the selected buffer to the first cache memory to empty the selected buffer and transferring the eviction data into the emptied selected buffer after one or more portions of the selected buffer have been emptied.

* * * * *